United States Patent
Won

(10) Patent No.: US 11,187,815 B2
(45) Date of Patent: Nov. 30, 2021

(54) METHOD OF DETERMINING LOCATION OF VEHICLE, APPARATUS FOR DETERMINING LOCATION, AND SYSTEM FOR CONTROLLING DRIVING

(71) Applicant: MANDO CORPORATION, Pyeongtaek-si (KR)

(72) Inventor: Giyeon Won, Suwon-si (KR)

(73) Assignee: Mando Corporation, Pyeongtaek-si (KR)

(*) Notice: Subject to any disclaimer, the term of this patent is extended or adjusted under 35 U.S.C. 154(b) by 30 days.

(21) Appl. No.: 16/594,608

(22) Filed: Oct. 7, 2019

(65) Prior Publication Data
US 2020/0110183 A1   Apr. 9, 2020

(30) Foreign Application Priority Data

Oct. 8, 2018 (KR) ......................... 10-2018-0120052

(51) Int. Cl.
| | |
|---|---|
| *G01S 19/48* | (2010.01) |
| *G06K 9/00* | (2006.01) |
| *G08G 1/0965* | (2006.01) |
| *G01C 21/28* | (2006.01) |
| *B60K 31/00* | (2006.01) |

(Continued)

(52) U.S. Cl.
CPC .............. *G01S 19/48* (2013.01); *G01C 21/28* (2013.01); *G06K 9/00798* (2013.01);
(Continued)

(58) Field of Classification Search
CPC ........ G01S 19/48; G01S 19/40; G01S 19/485; G06K 9/00798; G06K 2209/21;
(Continued)

(56) References Cited

U.S. PATENT DOCUMENTS

| | | | |
|---|---|---|---|
| 5,862,511 A * | 1/1999 | Croyle ................... | G01C 21/30 701/445 |
| 2002/0128775 A1* | 9/2002 | Brodie .................... | G01S 19/47 701/472 |

(Continued)

FOREIGN PATENT DOCUMENTS

| | | |
|---|---|---|
| JP | 2017-181167 A | 10/2017 |
| KR | 10-0945447 B1 | 3/2010 |

(Continued)

*Primary Examiner* — Sath V Perungavoor
*Assistant Examiner* — Tyler B Edwards
(74) *Attorney, Agent, or Firm* — Morgan, Lewis & Bockius LLP

(57) ABSTRACT

Disclosed are a method and an apparatus for determining a location of a vehicle and a system for controlling driving. The apparatus may include: an entry determiner configured to determine whether the vehicle enters the GPS shade area, based on the GPS location information of the vehicle; a location corrector configured to, when the vehicle enters the GPS shade area, calculate a movement distance by integrating a driving speed of the vehicle, based on the driving speed information of the vehicle, identify an adjacent target from the processing result of the image data to calculate an interval between the vehicle and the adjacent target, and correct the location of the vehicle indicated by the GPS location information of the vehicle received before the vehicle enters the GPS shade area, based on the movement distance and the interval; and a location determiner configured to, when the location of the vehicle indicated by the GPS location information of the vehicle is corrected, determine the corrected location of the vehicle as the location of the vehicle within the GPS shade area.

16 Claims, 8 Drawing Sheets

(51) Int. Cl.
  *H04N 5/225* (2006.01)
  *B60R 11/04* (2006.01)
(52) U.S. Cl.
  CPC ........ *G08G 1/0965* (2013.01); *B60K 31/0066* (2013.01); *B60R 11/04* (2013.01); *G06K 2209/21* (2013.01); *H04N 5/2253* (2013.01)
(58) Field of Classification Search
  CPC .. G06K 9/00791; G08G 1/0965; G01C 21/28; G01C 21/1656; B60K 31/0066; H04N 5/2253; B60R 11/04
  See application file for complete search history.

(56) References Cited

U.S. PATENT DOCUMENTS

| | | | | |
|---|---|---|---|---|
| 2004/0230374 | A1* | 11/2004 | Tzamaloukas | G01C 21/28 701/495 |
| 2007/0050130 | A1* | 3/2007 | Grimm | G08G 1/096791 701/420 |
| 2008/0040023 | A1* | 2/2008 | Breed | G01S 19/50 701/117 |
| 2014/0032100 | A1* | 1/2014 | Park | G01C 21/30 701/446 |
| 2016/0167582 | A1* | 6/2016 | Chen | G01C 21/32 348/148 |
| 2019/0278297 | A1* | 9/2019 | Averhart | G05D 1/0278 |

FOREIGN PATENT DOCUMENTS

| | | |
|---|---|---|
| KR | 10-1628427 B1 | 6/2016 |
| KR | 10-1837868 B1 | 3/2018 |

* cited by examiner

MF METHOD OF DETERMINING LOCATION OF VEHICLE, APPARATUS FOR DETERMINING LOCATION, AND SYSTEM FOR CONTROLLING DRIVING

CROSS REFERENCE TO RELATED APPLICATION

This application claims priority from Korean Patent Application No. 10-2018-0120052, filed on Oct. 8, 2018, which is hereby incorporated by reference for all purposes as if fully set forth herein.

BACKGROUND OF THE INVENTION

1. Field of the Invention

The present disclosure relates to a method of determining a location of a vehicle, an apparatus for determining a location, and a system for controlling driving.

2. Description of the Prior Art

In general, a navigation device refers to a location information provision system for providing Global Positioning System (GPS) location information on the basis of a satellite signal of a GPS.

The navigation device can display an accurate location in a place in which a satellite signal of the GPS can be accurately received, but cannot provide accurate GPS location information in a GPS shade area, such as a tunnel, an underground parking lot, or an underground passage, in which the satellite signal of the GPS has entire or partial loss.

Accordingly, in case the navigation device does not normally operate in the GPS shade area due to the loss of the GPS satellite signal, a technology for correcting GPS location information of the navigation device is required.

SUMMARY OF THE INVENTION

According to the described background, an aspect of the present disclosure is to provide a method and an apparatus for determining a location of a vehicle and a system for controlling driving which accurately measure the location of the vehicle within a GPS shade area.

Further, another aspect of the present disclosure is to provide a method and an apparatus for determining a location of a vehicle and a system for controlling driving which provide driving safety to a driver by accurately measuring the location of the vehicle within the GPS shade area. In accordance with an aspect of the present disclosure, an apparatus for determining a location of a vehicle is provided. The apparatus includes: an image sensor operable to be disposed at the vehicle so as to have a field of view of an exterior of the vehicle, the image sensor being configured to capture image data; a GPS receiver configured to receive GPS location information of the vehicle; and a controller including at least one processor configured to process the image data captured by the image sensor and GPS location information of the vehicle, wherein the controller is configured to determine whether the vehicle enters a GPS shade area, based on GPS location information of the vehicle, when the vehicle enters the GPS shade area, correct the location of the vehicles indicated by GPS location information of the vehicle, based on a processing result of the image data and driving speed information of the vehicle, and determine the corrected location of the vehicle as the location of the vehicle within the GPS shade area.

The controller may be configured to: when the vehicle enters the GPS shade area, determine a movement distance by integrating a driving speed of the vehicle, based on the driving speed information of the vehicle; and correct the location of the vehicle indicated by the GPS location information of the vehicle received before the vehicle enters the GPS shade area, based on the determined movement distance and the processing result of the image data.

The controller may be configured to: when the vehicle enters the GPS shade area, identify an adjacent target from the processing result of the image data and determine an interval between the vehicle and the identified adjacent target; and correct the location of the vehicle indicated by the GPS location information of the vehicle received before the vehicle enters the GPS shade area, based on the movement distance and the interval between the vehicle and the adjacent target.

The adjacent target may comprise an internal structure in the GPS shade area, and the controller may be configured to: generate a driving road form of the vehicle, based on a plurality of detection points of the internal structure; and determine an interval between the vehicle and the driving road shape in front of the vehicle.

The controller may be configured to correct the location of the vehicle to a location where a distance to the adjacent target coincides with the determined interval between the vehicle and the adjacent target and is spaced apart from the location of the vehicle indicated by the GPS location information of the vehicle, by the movement distance.

The adjacent target may comprise a stopped object, and when the driving speed information of the vehicle is not received, the controller may be configured to determine a relative speed for the stopped object and determine the movement distance by integrating the relative speed.

The appratus may further comprise a communication unit configured to be able to perform communication between vehicles, wherein the adjacent target may comprise a preceding vehicle having escaped the GPS shade area, and the controller may be configured to determine an interval between the vehicle and the preceding vehicle and correct the location of the vehicle, based on the location of the preceding vehicle indicated by the GPS location information of the preceding vehicle received by the communication unit and the interval between the vehicle and the preceding vehicle.

The apparatus may further comprise a communication unit configured to be able to perform communication between vehicles, wherein the adjacent target may comprise a following vehicle which has not entered the GPS shade area, and the controller may be configured to determine an interval between the vehicle and the following vehicle and correct the location of the vehicle, based on the location of the following vehicle indicated by the GPS location information of the following vehicle received by the communication unit and the interval between the vehicle and the following vehicle. In accordance with another aspect of the present disclosure, an apparatus for determining a location of a vehicle is provided. The apparatus includes: an image sensor operable to be disposed at the vehicle so as to have a field of view of an exterior of the vehicle, the image sensor being configured to capture image data; a non-image sensor operable to be disposed at the vehicle so as to have a field of sensing of an exterior of the vehicle, the non-image sensor being configured to capture sensing data; a GPS receiver configured to receive GPS location information of the vehicle; and a domain control unit comprising at least one processor configured to process at least one of the image data captured by the image sensor or the sensing data captured by the non-image sensor, and the GPS location information of the vehicle, wherein the domain control unit is configured to: determine whether the vehicle enters a GPS shade area based on the GPS location information of the vehicle, when the vehicle enters the GPS shade area, correct the location of the vehicle indicated by the GPS location information of the vehicle, based partially on a processing result of at least one of the image data or the sensing data and driving speed information of the vehicle, and determine the corrected location of the vehicle as the location of the vehicle within the GPS shade area.

The domain control unit may be configured to: determine whether the vehicle enters the GPS shade area, based on the GPS location information, when the vehicle enters the GPS shade area, determine a movement distance by integrating a driving speed of the vehicle, based on the driving speed information of the vehicle; and correct the location of the vehicle indicated by the GPS location information of the vehicle received before the vehicle enters the GPS shade area, based on the determined movement distance and the processing result of at least one of the image data or the sensing data.

The domain control unit may be configured to: when the vehicle enters the GPS shade area, identify an adjacent target from the processing result of at least one of the image data or the sensing data, determine an interval between the vehicle and the adjacent target, and correct the location of the vehicle indicated by the GPS location information received before the vehicle enters the GPS shade area, based on the movement distance and the interval between the vehicle and the adjacent target.

The adjacent target may comprise an internal structure in the GPS shade area, and the domain control unit may be configured to generate a driving road form of the vehicle, based on a plurality of detection points of the internal structure and determine an interval between the vehicle and the driving road form in front of the vehicle.

The domain control unit may be configured to correct the location of the vehicle to a location where a distance to the adjacent target coincides with the determined interval and is spaced apart from the position of the vehicle indicated by the GPS location information, by the movement distance.

The apparatus may further comprise a communication unit configured to be able to perform communication between vehicles, wherein the adjacent target may comprise a preceding vehicle having escaped the GPS shade area, and the domain control unit may be configured to determine an interval between the vehicle and the preceding vehicle, and correct the location of the vehicle, based on the location of the preceding vehicle indicated by the GPS location information of the preceding vehicle received by the communication unit and the interval between the vehicle and the preceding vehicle.

The apparatus may further comprises a communication unit configured to be able to perform communication between vehicles, wherein the adjacent target may comprise a following vehicle which has not entered the GPS shade area, and the domain control unit may be configured to determine an interval between the vehicle and the following vehicle, and correct the location of the vehicle, based on the location of the following vehicle indicated by the GPS location information of the following vehicle received by the communication unit and the interval between the vehicle and the following vehicle.

In accordance with another aspect of the present disclosure, a system for controlling driving of a vehicle is provided. The system includes: an image sensor operable to be disposed at the vehicle so as to have a field of view of an exterior of the vehicle, the image sensor being configured to capture image data; a GPS receiver configured to receive GPS location information of the vehicle; a cruise control module configured to control a driving speed of the vehicle to make the vehicle travel at an input target driving speed; and a domain control unit configured to process the image data captured by the image sensor and the GPS location information of the vehicle, and change the target driving speed based on a location of the vehicle, wherein the domain control unit is configured to determine whether the vehicle enters a GPS shade area, based on the GPS location information of the vehicle, when the vehicle enters the GPS shade area, correct the location of the vehicle indicated by the GPS location information of the vehicle, based partially on a processing result of at least one of the image data and the sensing data and driving speed information of the vehicle, and determine the corrected location of the vehicle as the location of the vehicle within the GPS shade area.

The domain control unit may be configured to change the target driving speed, when the location of the vehicle is within a restricted driving speed area.

The domain control unit may be configured to change the target driving speed, based on a speed corresponding to the restricted driving speed area, when the location of the vehicle is within a restricted driving speed area.

As described above, according to the present disclosure, it is possible to provide a method and an apparatus for determining a location of a vehicle and a system for controlling driving which accurately measure the location of the vehicle within a GPS shade area.

Further, according to the present disclosure, it is possible to provide a method and an apparatus for determining a location of a vehicle and a system for controlling driving which provide driving safety to a driver by accurately measuring the location of the vehicle within the GPS shade area.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments of the present disclosure will be described in detail with reference to the accompanying drawings. In the description of the elements of the present disclosure, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
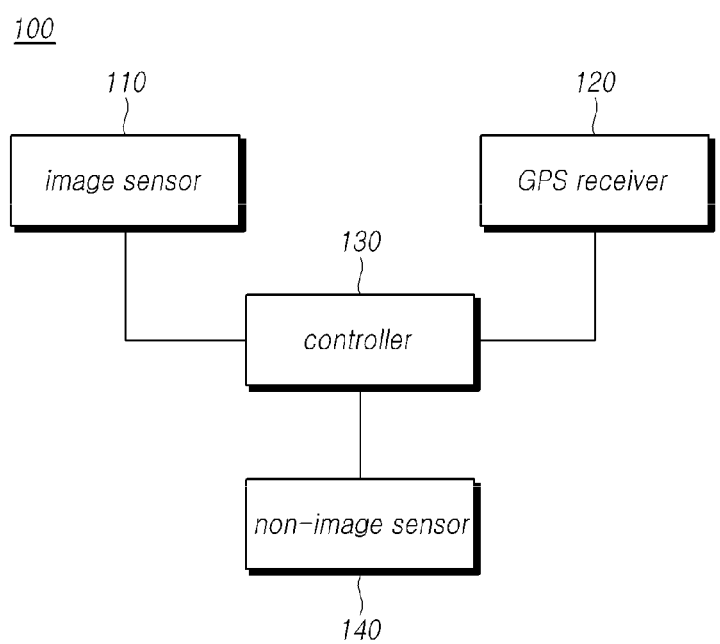
FIG. 1 illustrates elements included in an apparatus for determining a location of a vehicle according to the present disclosure.

FIG. 1 illustrates elements included in an apparatus 100 for determining a location of a vehicle according to the present disclosure.

Referring to FIG. 1, the apparatus 100 for determining the location of the vehicle according to the present disclosure may include an image sensor 110, a GPS receiver 120, and a controller 130.

The image sensor 110 may be disposed in the vehicle to have a field of view of an exterior of the vehicle and may capture image data.

At least one image sensor 110 may be mounted to each part of the vehicle to have a field of view of the front, side, or rear of the vehicle.

Image information photographed by the image sensor 110 consists of image data, which corresponds to image data captured by the image sensor 110. Hereinafter, the image information photographed by the image sensor 110 may be image data captured by the image sensor 110.

The image data captured by the image sensor 110 may be generated, for example, in one format of AVI, MPEG-4, H.264, DivX, and JPEG in a raw form. The image data captured by the image sensor 110 may be processed by a processor.

The GPS receiver 120 may receive GPS location information of the vehicle.

The GPS receiver 120 provides GPS location information to the controller 130 and thus a country or an area in which the vehicle currently travels is identified.

The GPS receiver 120 is preferably a GPS navigation system, and the GPS navigation system typically includes map information by which the GPS navigation system can directly provide an instruction to the controller 130 to identify the country or the area.

The GPS location information may include latitude and longitude data compared with reference GPS location information stored therein to determine a country or an area by the controller 130.

The GPS location information may indicate the location of the vehicle and the location of the vehicle may include location coordinates. For example, the location of the vehicle on a two-dimensional plane may include x and y coordinates. However, the present disclosure is not limited thereto.

The controller 130 may process image data captured by the image sensor 110 and GPS location information of the vehicle.

In order to implement the above-described operation, the controller 130 may include at least one processor.

The processor may operate to process the image data captured by the image sensor 110 and the GPS location information of the vehicle.

The controller 130 may determine whether the vehicle enters a GPS shade area on the basis of the GPS location information of the vehicle, correct the location of the vehicle indicated by the GPS location information of the vehicle on the basis of the processing result of the image data and driving speed information of the vehicle when the vehicle enters the GPS shade area, and determine the corrected location of the vehicle as the location of the vehicle within the GPS shade area.

The controller may be implemented as a Domain Control Unit (DCU) which can integrate and perform a function of the processor for processing data, a function for outputting a generated control signal to a steering control module and a brake control module to control movement of the vehicle, and a function for performing CAN communication with an Advanced Driver Assistance System (ADAS) module to control performance of an ADAS function.

The ADAS module may be, for example, a cruise control module for controlling a driving speed of the vehicle to make the vehicle travel at an input target driving speed.

Accordingly, the vehicle may travel through a system for controlling driving including the image sensor 110, the GPS receiver 120, the cruise control module, and the Domain Control Unit (DCU) configured to process the image data captured by the image sensor and the GPS location information of the vehicle, and change the target driving speed based on a location of the vehicle.

The DCU may change the target driving speed, when the location of the vehicle is within a restricted driving speed area. Specifically, the DCU may change the target driving speed, based on a speed corresponding to the restricted driving speed area, when the location of the vehicle is within a restricted driving speed area.

Meanwhile, the apparatus 100 for determining the location of the vehicle may be disposed in the vehicle to have a field of sensing of an exterior of the vehicle and may further include a non-image sensor 140 configured to capture sensing data.

The non-image sensor 140 may include, for example, a radar sensor, a lidar sensor, and an ultrasound sensor.

The processing result of image data and sensing data may include stopped object, preceding vehicles, and following vehicles.

The stopped objects may be, for example, internal structures within the GPS shade area and signs. The internal structures may be, for example, walls or lanes within a tunnel. However, the present disclosure is not limited thereto.

According to an embodiment of the apparatus 100 for determining the location of the vehicle including the controller 130 implemented as the DCU and the non-image sensor 140, the apparatus 100 for determining the location of the vehicle includes the image sensor 110 operable to be disposed at the vehicle so as to have a field of view of an exterior of the vehicle, the image sensor being configured to capture image data, the non-image sensor 140 operable to be disposed at the vehicle so as to have a field of sensing of an exterior of the vehicle, the non-image sensor 140 being configured to capture sensing data; the GPS receiver 120 configured to receive GPS location information of the vehicle, and the domain control unit including at least one processor configured to process at least one piece of the image data captured by the image sensor 110 or the sensing data captured by the non-image sensor 140, and the GPS location information of the vehicle, wherein the domain control unit determines whether the vehicle enters a GPS shade area, based on the GPS location information of the vehicle, when the vehicle enters the GPS shade area, corrects the location of the vehicle indicated by the GPS location information of the vehicle, based partially on a processing result of at least one piece of the image data or the sensing data and driving speed information of the vehicle, and determines the corrected location of the vehicle as the location of the vehicle within the GPS shade area.

Figure 2:
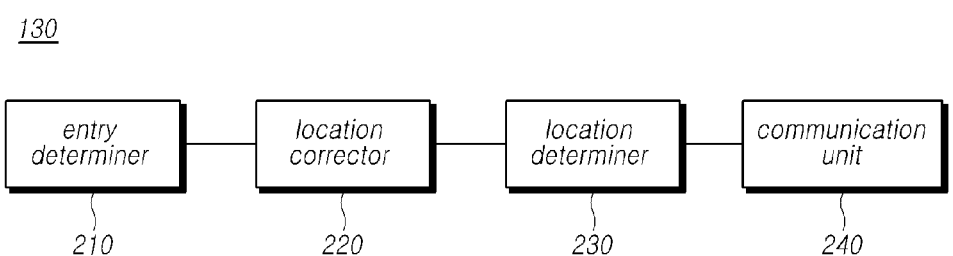
FIG. 2 illustrates elements included in a controller according to the present disclosure.

FIG. 2 illustrates elements included in the controller 130 according to the present disclosure.

Referring to FIGS. 1 and 2, the controller 130 according to the present disclosure may include an entry determiner 210, a location corrector 220, and a location determiner 230.

The entry determiner 210 may determine whether the vehicle enters the GPS shade area on the basis of GPS location information of the vehicle.

Specifically, when the GPS location information is received by the GPS receiver 120, the entry determiner 210 may identify the location of the vehicle indicated by the GPS location information, identify the GPS shade area existing in front of the vehicle on the basis of map information provided by the GPS receiver 120, and identify whether the location of the vehicle is spaced apart from the entrance of the GPS shade area by a preset reference distance, so as to determine whether the vehicle enters the GPS shade area.

The GPS shade area is an area in which a satellite signal of the GPS has total or partial loss and thus GPS location information has an error. The GPS shade area may include an underground parking lot and an underground passage. However, the present disclosure is not limited thereto.

When the vehicle enters the GPS shade area, the location corrector 220 may calculate a movement distance by integrate a driving speed of the vehicle on the basis of driving speed information of the vehicle, identify an adjacent target included in detection information to calculate an interval between the vehicle and the adjacent target, and correct the location of the vehicle indicated by the GPS location information received before the vehicle enters the GPS shade area on the basis of the movement distance and the interval.

The driving speed of the vehicle may include all of a longitudinal driving speed, which is a longitudinal component, and a transverse driving speed, which is a transverse component. That is, the driving speed of the vehicle may be a sum of vectors of the longitudinal driving speed and the transverse driving speed.

The location corrector 220 may integrate each of the longitudinal driving speed and the transverse driving speed in the driving speed of the vehicle.

When the location corrector 220 integrates each of the longitudinal driving speed and the transverse driving speed, a movement distance calculated by the integral may include a longitudinal movement distance and the transverse movement distance.

In light of location coordinates indicating the location of the vehicle, the location corrector 220 may add the calculated longitudinal movement distance to location coordinates (for example, x coordinates) and add the calculated transverse movement distance to location coordinates (for example, y coordinates), so as to correct the location of the vehicle.

The adjacent target identified from the processing result of at least one piece of the image data or the sensing data may correspond to, for example, the stopped object, the preceding vehicle, or the following vehicle as described above. The stopped object may be an interval structure within the GPS shade area or a sign. The internal structures may be, for example, walls or lanes within a tunnel. However, the present disclosure is not limited thereto.

The interval between the vehicle and the adjacent target may be, for example, an interval between the vehicle and a wall within a tunnel, an interval between the vehicle and a preceding vehicle, or an interval between the vehicle and a following vehicle. However, the present disclosure is not limited thereto.

The GPS location information received before the vehicle enters the GPS shade area may correspond to a GPS location signal indicating the location of the vehicle before the vehicle enters the GPS shade area. Preferably, the GPS location information may be GPS location information at the entrance of the GPS shade area. However, the present disclosure is not limited thereto.

When the location of the vehicle indicated by the GPS location information is corrected, the location determiner 230 may determine the corrected location of the vehicle as the location of the vehicle within the GPS shade area.

Meanwhile, the location determiner 230 identifies the state of the GPS shade area on the basis of map information provided by the GPS receiver 120 and, when it is determined that the vehicle escapes the GPS shaded area on the basis of the corrected location of the vehicle, determines the location of the vehicle on the basis of GPS location information of the vehicle received by the GPS receiver 120.

The controller 130 according to the present disclosure may further include a communication unit 240 which can perform communication between vehicles.

The communication unit 240 may transmit the location of the vehicle, for example, information on location coordinates based on the GPS location information of the vehicle to another vehicle, or receive the location of another vehicle, for example, information on location coordinates.

In order to transmit or receive the information, the communication unit 240 may use V2X communication, which is communication between vehicles.

V2X according to the present disclosure means an exchange of information between the vehicle and an object, such as an adjacent vehicle, a mobile device, or a road, or technology therefor. V2X includes concepts of Vehicle to Vehicle (V2V), Vehicle to Infrastructure (V2I), Vehicle to Nomadic Device (V2N), and Vehicle to Pedestrian (V2P), and V2V communication is mainly used in the present disclosure.

V2X is based on Dedicated Short-Range Communications (DSRC), and may use Wireless Access in Vehicular Environment (WAVE), recently developed by IEEE or IEEE 802.11p communication technology, using a 5.9 GHz band, but is not limited thereto. It should be understood that V2X includes any communication between vehicles that does not exist at present but is to be developed in the future.

Although not illustrated, the controller 130 according to the present disclosure may further include a storage unit configured to store GPS location information, map information, detection information, and driving speed information.

Hereinafter, an embodiment of a method of correcting the location of the vehicle entering the GPS shade area will be described.

Figure 3:
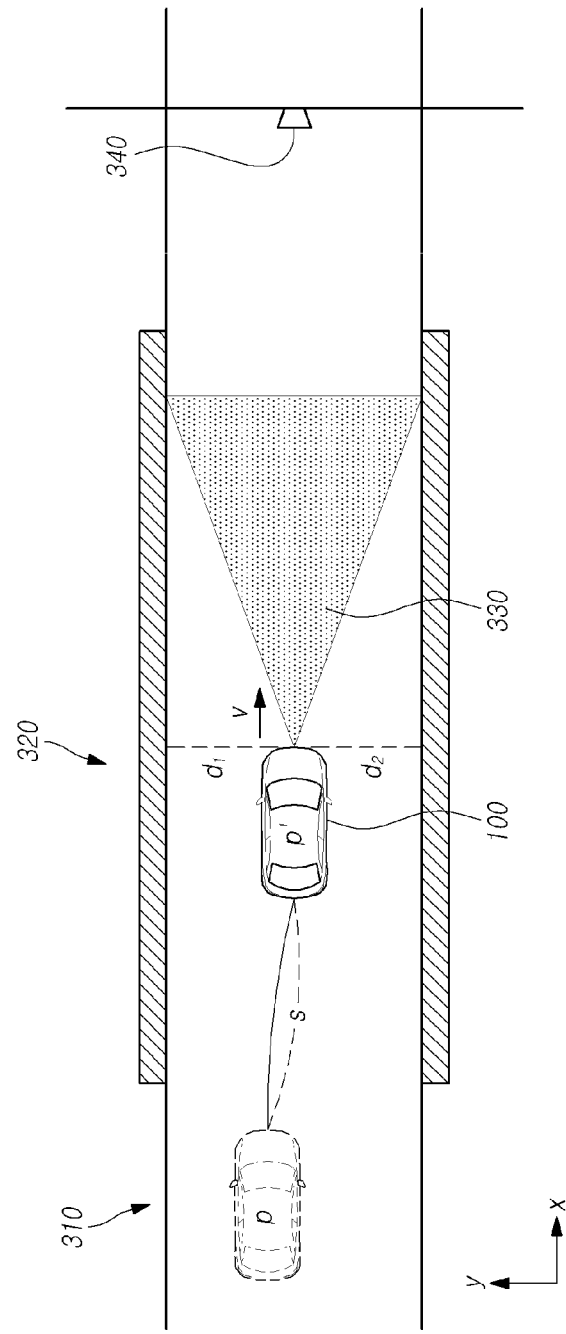
FIG. 3 illustrates a first embodiment of a method of correcting the location of the vehicle when the vehicle enters a GPS shade area according to the present disclosure.

FIG. 3 illustrates a first embodiment of the method of correcting the location of a vehicle 100 when the vehicle 100 enters a GPS shade area 320 according to the present disclosure.

Referring to FIG. 3, when the vehicle 100 according to the present disclosure travels on a general road 310, a navigation device (not shown) outputs GPS location information on a display device (not shown) mounted to the vehicle 100. A driver of the vehicle 100 may watch the display device (not shown) and check the location of the vehicle 100, for example, a first location coordinate p.

At this time, the vehicle 100 may enter the GPS shade area 320 existing in front thereof. In this case, the navigation device has difficulty in accurately measuring the location of the vehicle 100 due to an influence of the GPS shade area 320.

The entry determiner 210 determines whether the vehicle 100 enters the GPS shade area 320 on the basis of GPS location information of the vehicle 100.

Subsequently, the location corrector 220 calculates a movement distance s by integrating a driving speed v of the vehicle 100 when the vehicle 100 enters the GPS shade area 320.

For example, the location corrector 220 calculates a longitudinal movement distance and a transverse movement distance by integrating each of a longitudinal driving speed and a transverse driving speed included in the driving speed v of the vehicle 100.

Meanwhile, the location corrector 220 may not directly know the driving speed of the vehicle 100 due to a malfunction of a vehicle speed sensor included in the vehicle 100. In this case, the location corrector 220 may identify a stopped object included in detection information and integrate a relative speed between the vehicle 100 and the stopped object, so as to calculate the movement distance s.

For example, the adjacent target includes the stopped object, for example, an internal wall of the GPS shade area 320 and, when the location corrector 220 does not receive the driving speed of the vehicle 100, the location corrector 220 may calculate a relative speed v of the stopped object and integrate the relative speed v to calculate the movement distance s.

Meanwhile, the location corrector 220 identifies the adjacent target included in the detection information and calculates an interval between the vehicle 100 and the adjacent target.

For example, the location corrector 220 identifies the interval wall of the GPS shade area 320 included in the detection information received from the surrounding detection sensor 120 including a forward detection area 330 and calculates a first interval d1 and a second interval d2 between the vehicle 100 and left and right interval walls.

When the movement distance s, the first interval d1, and the second interval d2 are calculated, the location corrector 220 may apply the movement distance s in the location of the vehicle 100, for example, the first location coordinate p before the entry into the GPS shade area 320 and additionally may apply the first interval d1 and the second interval d2 to correct the location of the vehicle 100, for example, the first location coordinate p.

Specifically, the location corrector 220 may correct the location of the vehicle 100 to a location where a distance to the adjacent target coincides with the determined interval and is spaced apart from the location of the vehicle 100 before the entry into the GPS shade area 320 (that is, the location of the vehicle 100 indicated by the GPS location information of the vehicle), by the movement distance. In this case, the determined interval may mean an interval between the vehicle 100 and the adjacent target calculated based on the detection information.

For example, the location corrector 220 may correct the location of the vehicle 100 to a second location coordinate p'. The second location coordinate p' is determined to be spaced apart from the first location coordinate p by the movement distance s and to be have a distance to the adjacent target which coincides with the determined interval d1 and d2, respectively. When the location of the vehicle 100, for example, the first location coordinate p is corrected, the location determiner 230 determines the corrected location of the vehicle 100, as a second location coordinate p' as the location of the vehicle 100 within the GPS shade area 320.

By continuously performing the above operation in the GPS shade area 320, the location of the vehicle 100 may be determined and the vehicle 100 may be controlled in accordance with infrastructure 340 located outside the GPS shade area 320, for example, a speed camera.

As described above, the GPS shade area 320 may include a straight road or a curved road. Hereinafter, an embodiment of a method of correcting the location of the vehicle 100 in the GPS shade area 320 including a curved road will be described.

Figure 4:
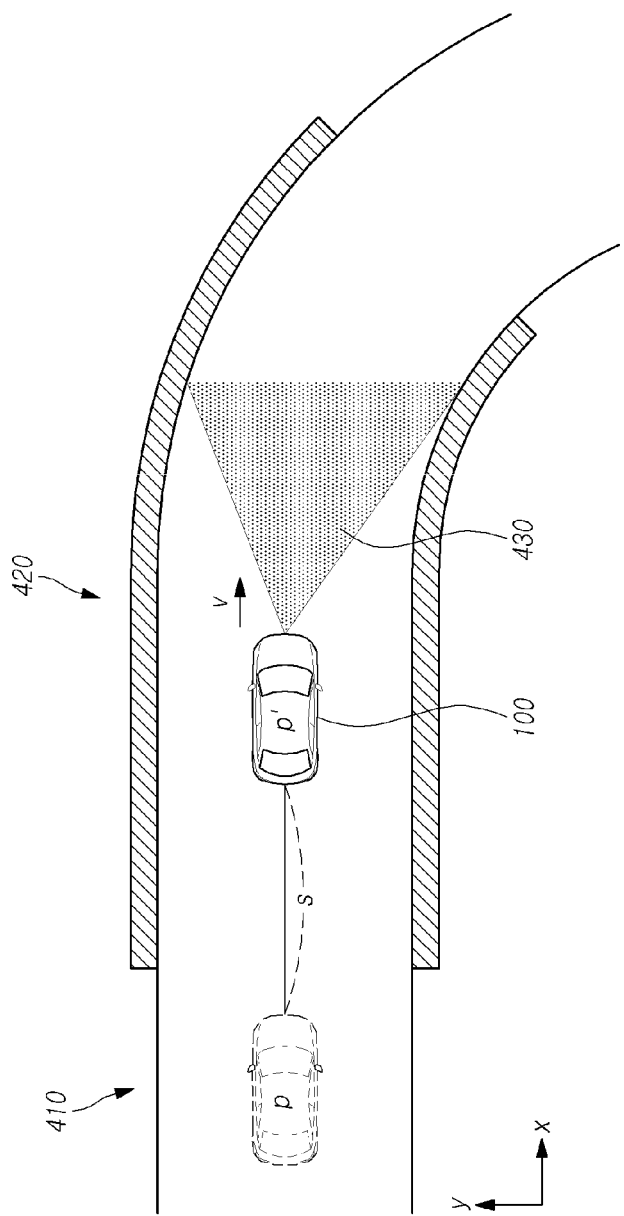
FIG. 4 illustrates a second embodiment of the method of correcting the location of the vehicle when the vehicle enters the GPS shade area according to the present disclosure.
Figure 5:
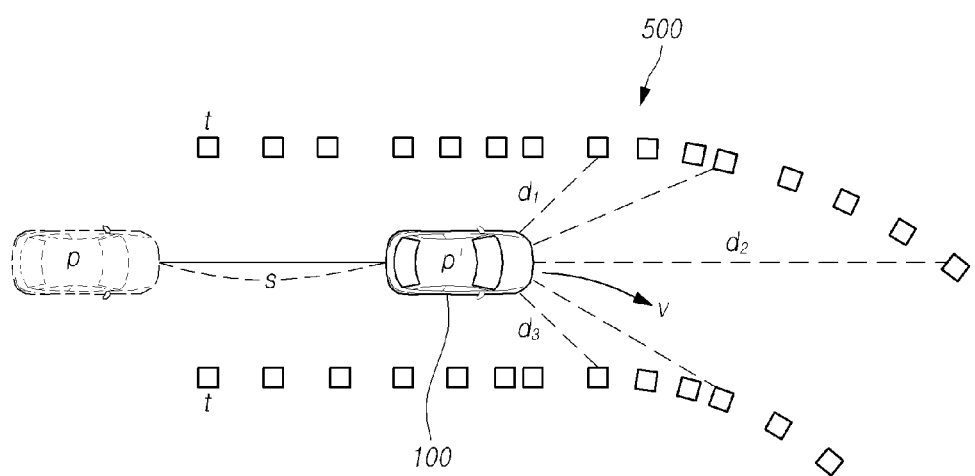
FIG. 5 illustrates an embodiment of a method of generating a driving road form within the GPS shade area according to the present disclosure.

FIG. 4 illustrates a second embodiment of the method of correcting the location of the vehicle 100 when the vehicle 100 enters a GPS shade area 420 according to the present disclosure, and FIG. 5 illustrates an embodiment of a method of generating a driving road form 500 within the GPS shade area 420.

Referring to FIG. 4, like in the description made with reference to FIG. 3, when the vehicle 100 according to the present disclosure travels on a general road 410, the navigation device may provide the location of the vehicle 100, for example, the first location coordinate p but, thereafter, has difficulty in accurately measuring the location of the vehicle 100 when the vehicle 100 enters the GPS shade area 420.

The entry determiner 210 determines whether the vehicle 100 enters the GPS shade area 320 on the basis of GPS location information of the vehicle 100.

Subsequently, the location corrector 220 calculates a movement distance s by integrating a driving speed v of the vehicle 100 when the vehicle 100 enters the GPS shade area 320.

At this time, when the GPS shade area 420 includes a curved road, the location corrector 220 may correct the location of the vehicle 100 on the basis of the driving road form including the curvature of the curved road.

Referring to FIG. 5, for example, the location corrector 220 generates the driving road form 500 of the vehicle 100 on the basis of a plurality of detection points t of the interval structure and calculates an interval between the vehicle and the driving road form in front of the vehicle 100. The adjacent target includes interval structure (or internal wall) in the GPS shade area 420.

Specifically, the image sensor 110 including the forward detection area 430 detects the curvature of the curved road included in the GPS shade area 420, and a radar included in the non-image sensor 140 including the forward detection area 430 detects the interval wall of the GPS shade area 420 and generates and outputs detection information including a plurality of detection points t corresponding to the interval wall.

The location corrector 220 generates the driving road form 500 by combining the curvature of the curved road with the plurality of detection points t. Next, the location corrector 220 calculates a first interval d1, a second interval d2, and a third interval d3 between the vehicle 100 and the plurality of detection points t corresponding to the interval wall in front of the vehicle 100.

Preferably, the second interval d2 may be an interval measured in a driving direction or a forward direction of the vehicle 100.

The location corrector 220 may apply the movement distance s in the location of the vehicle 100 indicated by the GPS location information and control the location of the vehicle 100 to match the intervals (the first interval d1 to the third interval d3), so as to correct the location of the vehicle.

Specifically, the location corrector 220 may apply the movement distance s in the location of the vehicle 100, for example, the first location coordinate p before the entry into the GPS shade area 320. Further, the location corrector 220 may match the location coordinate of the vehicle 100 in which the movement distance s is applied with the calculated first interval d1 to third interval d3 and the driving road form 500 to correct the location of the vehicle 100, for example, the first location coordinate p.

The location corrector 220 may receive provided map information and match the location of the vehicle 100 in which the movement distance s and the first interval d1 to the third interval d3 are applied with the map information, so as to additionally correct the location of the vehicle 100.

Meanwhile, there may be a preceding vehicle, which has escaped the GPS shade area 320 or 420, or a following vehicle which has not entered the GPS shade area 320 or 420 yet.

Hereinafter, an embodiment of a method of correcting the location of the vehicle 100 on the basis of location coordinates of the preceding vehicle and/or the following vehicle will be described.

Figure 6:
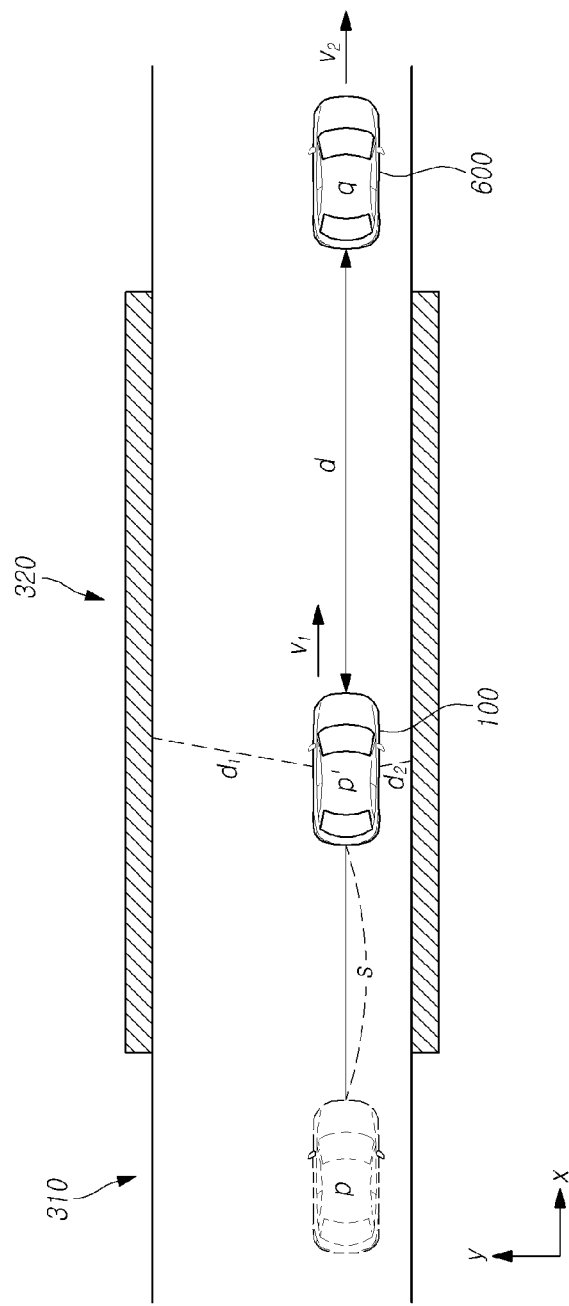
FIG. 6 illustrates a third embodiment of the method of correcting the location of the vehicle when the vehicle enters the GPS shade area according to the present disclosure.
Figure 7:
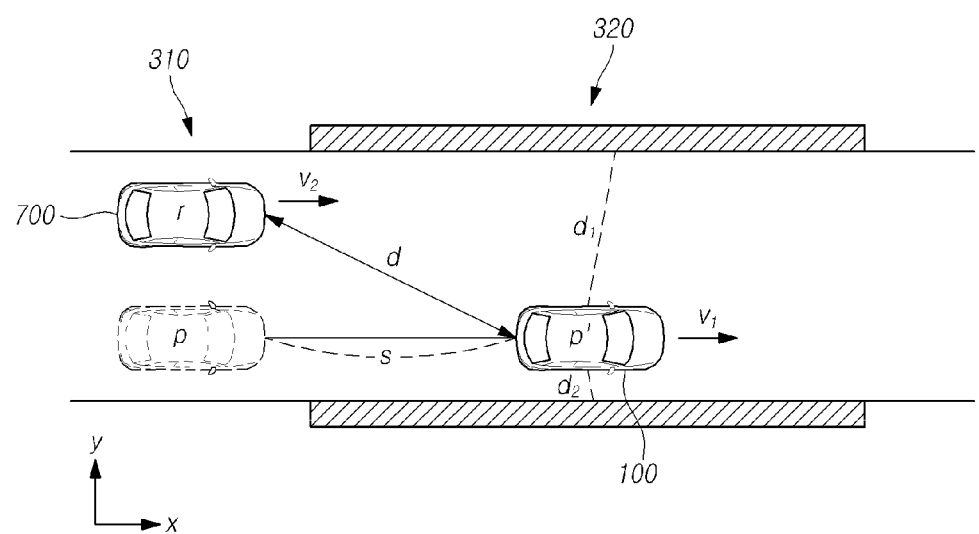
FIG. 7 illustrates a fourth embodiment of the method of correcting the location of the vehicle when the vehicle enters the GPS shade area according to the present disclosure.

FIG. 6 illustrates a third embodiment of a method of correcting the location of the vehicle 100 when the vehicle 100 enters the GPS shade area 320 according to the present disclosure, and FIG. 7 illustrates a fourth embodiment of the method of correcting the location of the vehicle 100 when the vehicle 100 enters the GPS shade area 320 according to the present disclosure.

First, the method of correcting the location of the vehicle 100 in the case in which the a preceding vehicle 600 moving in front of the vehicle 100 escapes the GPS shade area 320 will be described.

Referring to FIG. 6, like in the description made with reference to FIGS. 3 to 5, the location corrector 220 may calculate the movement distance s by integrating a driving speed v1 of the vehicle 100, calculate a first interval d1 and a second interval d2 between the vehicle 100 and adjacent targets, for example, interval walls of the GPS shade area 320, and correct the location of the vehicle 100, for example, a first location coordinate p by applying the movement distance s, the first interval d1, and the second interval d2 in the location of the vehicle 100, for example, the first location coordinate p before the entry into the GPS shade area 320.

At this time, when there is the preceding vehicle 600, which has escaped the GPS shade area 320, the location corrector 220 may receive the location of the preceding vehicle 600, for example, a third location coordinate q through the communication unit 240 and additionally correct the location of the vehicle 100 on the basis of the location of the preceding vehicle 600 and an interval between the vehicle 100 and the preceding vehicle 600.

For example, on the basis of GPS location information of the preceding vehicle 600 received through the communication unit 240, the location corrector 200 may apply an interval d between the vehicle 100 and the preceding vehicle 600 in the location of the preceding vehicle 600, for example, the third location coordinate q indicated by the GPS location information of the preceding vehicle 600 and corrects the location of the vehicle 100, for example, the first location coordinate p. In this case, the adjacent target includes the preceding vehicle 600 having escaped the GPS shade area 320.

Specifically, the location corrector 220 may apply the calculated movement distance s, first interval d1, and second interval d2 in the location of the vehicle 100, for example, the first location coordinate p before the entry into the GPS shade area 320 and corrects the location of the vehicle 100, for example, the first location coordinate p. The location corrector 220 calculates the interval d between the vehicle 100 and the preceding vehicle 600, receives the location of the preceding vehicle 600, for example, the third location coordinate q, and additionally correct the location of the vehicle 100, for example, the first location coordinate p to match the location coordinate generated by applying components (longitudinal component and transverse component) of the interval d between the vehicle 100 and the preceding vehicle 600 in the location of the preceding vehicle 600, for example, in components (x coordinate and y coordinate) of the third location coordinate q.

When the location of the vehicle 100, for example, the first location coordinate p is corrected, the location determiner 230 determines the corrected location of the vehicle 100, as a second location coordinate p' as the location of the vehicle 100 within the GPS shade area 320.

Meanwhile, the method of correcting the location of the vehicle 100 before a following vehicle 700 moving behind the vehicle 100 enters the GPS shade area 320 will be described.

Referring to FIG. 7, like in the description made with reference to FIGS. 3 to 5, the location corrector 220 may apply the movement distance s, the first interval d1, and the second interval d2 to correct the location of the vehicle 100, for example, the first location coordinate p.

At this time, when there is the following vehicle 700, which has not entered the GPS shade area 320 yet, the location corrector 220 may receive the location of the following vehicle 700, for example, a fourth location coordinate r through the communication unit 240 and additionally correct the location of the vehicle 100 on the basis of the location of the following vehicle 700 and an interval between the vehicle 100 and the following vehicle 700.

For example, on the basis of GPS location information of the following vehicle 700 received through the communication unit 240, the location corrector 220 may apply the interval d between the vehicle 100 and the following vehicle 700 in the location of the following vehicle 700, for example, the fourth location coordinate r indicated by the GPS location information of the following vehicle 700 and corrects the location of the vehicle 100, for example, the first location coordinate p. In this case, the adjacent target includes the following vehicle 700 which has not entered the GPS shade area 320 yet.

Specifically, the location corrector 220 may apply the calculated movement distance s, first interval d1, and second interval d2 in the location of the vehicle 100, for example, the first location coordinate p before the entry into the GPS shade area 320 and corrects the location of the vehicle 100, for example, the first location coordinate p. Further, the location corrector 220 calculates the interval d between the vehicle 100 and the following vehicle 700, receives the location of the following vehicle 700, for example, the fourth location coordinate r, and additionally correct the location of the vehicle 100, for example, the first location coordinate p to match the location coordinate generated by applying components (longitudinal component and transverse component) of the interval d between the vehicle 100 and the following vehicle 700 in the location of the following vehicle 700, for example, in components (x coordinate and y coordinate) of the fourth location coordinate r.

When the location of the vehicle 100, for example, the first location coordinate p is corrected, the location determiner 230 determines the corrected location of the vehicle 100, as a second location coordinate p' as the location of the vehicle 100 within the GPS shade area 320.

Although the present disclosure has been described on the basis of the GPS shade area 320 including the straight road in FIGS. 6 and 7, the GPS shade area 420 including the curved road illustrated in FIGS. 4 and 5 may be equally applied to the present disclosure.

Hereinafter, a method of determining a location of a vehicle by which the present disclosure can be implemented will be described.

Figure 8:
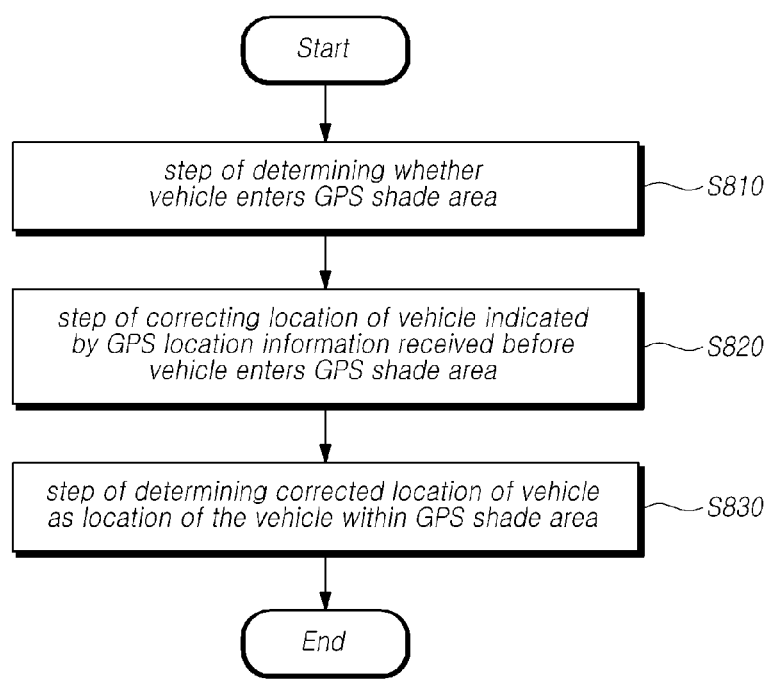
FIG. 8 is a flowchart illustrating a method of determining the location of the vehicle according to the present disclosure.

FIG. 8 is a flowchart illustrating the method of determining the location of the vehicle according to the present disclosure.

Referring to FIG. 8, the method of determining the location of the vehicle 100 according to the present disclosure may include a step S810 of determining whether the vehicle enters a GPS shade area, based on GPS location information of the vehicle; a step S820 of, when the vehicle enters the GPS shade area, calculating a movement distance by integrating a driving speed of the vehicle, based on the driving speed information of the vehicle, identifying an adjacent target from the processing result of the image data to calculate an interval between the vehicle and the adjacent target, and correcting the location of the vehicle indicated by the GPS location information of the vehicle received before the vehicle enters the GPS shade area, based on the movement distance and the interval; and a step S830 of, when the location of the vehicle indicated by the GPS location information of the vehicle is corrected, determining the corrected location of the vehicle as the location of the vehicle within the GPS shade area.

As described above, according to the present disclosure, it is possible to provide a method and an apparatus for determining a location of a vehicle and a system for controlling driving which accurately measure the location of the vehicle within a GPS shade area.

Further, according to the present disclosure, it is possible to provide a method and an apparatus for determining a location of a vehicle and a system for controlling driving which provide driving safety to a driver by accurately measuring the location of the vehicle within the GPS shade area.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. That is, at least two elements of all structural elements may be selectively joined and operate without departing from the scope of the present disclosure. The scope of the present disclosure shall be construed on the basis of the accompanying claims in such a manner that all of the technical ideas included within the scope equivalent to the claims belong to the present disclosure.

What is claimed is:

1. An apparatus for determining a location of a vehicle, the apparatus comprising:
    an image sensor operable to be disposed at the vehicle so as to have a field of view of an exterior of the vehicle, the image sensor being configured to capture image data;
    a GPS receiver configured to receive GPS location information of the vehicle;
    a communication unit configured to perform communication between vehicles and receive at least one of GPS location information of a preceding vehicle or GPS location information of a following vehicle; and
    a controller comprising at least one processor configured to process the image data captured by the image sensor and the GPS location information of the vehicle,
    wherein the controller is configured to:
        determine whether the vehicle enters a GPS shade area, based on the GPS location information of the vehicle,
        when the vehicle enters the GPS shade area, correct the location of the vehicle indicated by the GPS location information of the vehicle, based on a processing result of the image data, driving speed information of the vehicle, and the at least one of the GPS location information of the preceding vehicle or the GPS location information of the following vehicle, and determine the corrected location of the vehicle as the location of the vehicle within the GPS shade area,
        when the vehicle enters the GPS shade area, determine a movement distance by integrating a driving speed of the vehicle, based on the driving speed information of the vehicle, and
        when the vehicle enters the GPS shade area, identify an adjacent target from the processing result of the image data and determine an interval between the vehicle and the identified adjacent target,
    wherein the adjacent target comprises an internal structure in the GPS shade area, and
    wherein the controller is further configured to:
        generate a driving road form of the vehicle, based on a plurality of detection points of the internal structure,
        calculate a plurality of intervals between the vehicle and the respectively plurality of detection points corresponding to an interval wall of the internal structure in front of the vehicle, and
        match the location coordinate of the vehicle in which the movement distance is applied with the plurality of intervals and the driving road form to correct the location of the vehicle.

2. The apparatus of claim 1, wherein the controller is further configured to
    correct the location of the vehicle indicated by the GPS location information of the vehicle received before the vehicle enters the GPS shade area, based on the determined movement distance and the processing result of the image data.

3. The apparatus of claim 2, wherein the controller is configured to
    correct the location of the vehicle indicated by the GPS location information of the vehicle received before the vehicle enters the GPS shade area, based on the movement distance and the interval between the vehicle and the adjacent target.

4. The apparatus of claim 3, wherein the controller is configured to correct the location of the vehicle to a location where a distance to the adjacent target coincides with the determined interval between the vehicle and the adjacent target and is spaced apart from the location of the vehicle indicated by the GPS location information of the vehicle, by the movement distance.

5. The apparatus of claim 3, wherein the adjacent target comprises a stopped object, and when the driving speed information of the vehicle is not received, the controller is configured to determine a relative speed for the stopped object and determine the movement distance by integrating the relative speed.

6. The apparatus of claim 3, wherein the adjacent target comprises the preceding vehicle having escaped the GPS shade area, and the controller is configured to determine an interval between the vehicle and the preceding vehicle and correct the location of the vehicle, based on the location of the preceding vehicle indicated by the GPS location information of the preceding vehicle received by the communication unit and the interval between the vehicle and the preceding vehicle.

7. The apparatus of claim 3, wherein the adjacent target comprises the following vehicle which has not entered the GPS shade area, and the controller is configured to determine an interval between the vehicle and the following vehicle and correct the location of the vehicle, based on the location of the following vehicle indicated by the GPS location information of the following vehicle received by the communication unit and the interval between the vehicle and the following vehicle.

8. An apparatus for determining a location of a vehicle, the apparatus comprising:
an image sensor operable to be disposed at the vehicle so as to have a field of view of an exterior of the vehicle, the image sensor being configured to capture image data;
a non-image sensor operable to be disposed at the vehicle so as to have a field of sensing of an exterior of the vehicle, the non-image sensor being configured to capture sensing data;
a GPS receiver configured to receive GPS location information of the vehicle;
a communication unit configured to perform communication between vehicles and receive at least one of GPS location information of a preceding vehicle or GPS location information of a following vehicle; and
a domain control unit comprising at least one processor configured to process at least one of the image data captured by the image sensor or the sensing data captured by the non-image sensor, and the GPS location information of the vehicle,
wherein the domain control unit is configured to:
determine whether the vehicle enters a GPS shade area based on the GPS location information of the vehicle,
when the vehicle enters the GPS shade area, correct the location of the vehicle indicated by the GPS location information of the vehicle, based partially on a processing result of at least one of the image data or the sensing data, driving speed information of the vehicle, and the at least one of the GPS location information of the preceding vehicle or the GPS location information of the following vehicle,
determine the corrected location of the vehicle as the location of the vehicle within the GPS shade area,
determine whether the vehicle enters the GPS shade area, based on the GPS location information,
when the vehicle enters the GPS shade area, determine a movement distance by integrating a driving speed of the vehicle, based on the driving speed information of the vehicle,
when the vehicle enters the GPS shade area, identify an adjacent target from the processing result of at least one of the image data or the sensing data, the adjacent target comprising an internal structure in the GPS shade area,
generate a driving road form of the vehicle, based on a plurality of detection points of the internal structure and determine an interval between the vehicle and the driving road form in front of the vehicle,
calculate a plurality of intervals between the vehicle and the respectively plurality of detection points corresponding to an interval wall of the internal structure in front of the vehicle, and
match the location coordinate of the vehicle in which the movement distance is applied with the plurality of intervals and the driving road form to correct the location of the vehicle.

9. The apparatus of claim 8, wherein the domain control unit is further configured to
correct the location of the vehicle indicated by the GPS location information of the vehicle received before the vehicle enters the GPS shade area, based on the determined movement distance and the processing result of at least one of the image data or the sensing data.

10. The apparatus of claim 9, wherein the domain control unit is further configured to
correct the location of the vehicle indicated by the GPS location information received before the vehicle enters the GPS shade area, based on the movement distance and the interval between the vehicle and the adjacent target.

11. The apparatus of claim 10, wherein the domain control unit is configured to correct the location of the vehicle to a location where a distance to the adjacent target coincides with the determined interval and is spaced apart from the position of the vehicle indicated by the GPS location information, by the movement distance.

12. The apparatus of claim 10, wherein the adjacent target comprises the preceding vehicle having escaped the GPS shade area, and the domain control unit is configured to determine an interval between the vehicle and the preceding vehicle, and correct the location of the vehicle, based on the location of the preceding vehicle indicated by the GPS location information of the preceding vehicle received by the communication unit and the interval between the vehicle and the preceding vehicle.

13. The apparatus of claim 10, wherein the adjacent target comprises the following vehicle which has not entered the GPS shade area, and the domain control unit is configured to determine an interval between the vehicle and the following vehicle, and correct the location of the vehicle, based on the location of the following vehicle indicated by the GPS location information of the following vehicle received by the communication unit and the interval between the vehicle and the following vehicle.

14. A system for controlling driving of a vehicle, the system comprising:
- an image sensor operable to be disposed at the vehicle so as to have a field of view of an exterior of the vehicle, the image sensor being configured to capture image data;
- a GPS receiver configured to receive GPS location information of the vehicle;
- a cruise control module configured to control a driving speed of the vehicle to make the vehicle travel at an input target driving speed;
- a communication unit configured to perform communication between vehicles and receive at least one of GPS location information of a preceding vehicle or GPS location information of a following vehicle; and
- a domain control unit configured to:
  - process the image data captured by the image sensor and the GPS location information of the vehicle, and change the target driving speed based on a location of the vehicle,
  - determine whether the vehicle enters a GPS shade area, based on the GPS location information of the vehicle,
  - when the vehicle enters the GPS shade area, correct the location of the vehicle indicated by the GPS location information of the vehicle, based partially on a processing result of the image data, driving speed information of the vehicle, and the at least one of the GPS location information of the preceding vehicle or the GPS location information of the following vehicle,
  - determine the corrected location of the vehicle as the location of the vehicle within the GPS shade area,
  - when the vehicle enters the GPS shade area, determine a movement distance by integrating a driving speed of the vehicle, based on the driving speed information of the vehicle,
  - when the vehicle enters the GPS shade area, identify an adjacent target from the processing result of at least one of the image data or the sensing data, the adjacent target comprising an internal structure in the GPS shade area,
  - generate a driving road form of the vehicle, based on a plurality of detection points of the internal structure and determine an interval between the vehicle and the driving road form in front of the vehicle,
  - calculate a plurality of intervals between the vehicle and the respectively plurality of detection points corresponding to an interval wall of the internal structure in front of the vehicle, and
  - match the location coordinate of the vehicle in which the movement distance is applied with the plurality of intervals and the driving road form to correct the location of the vehicle.

15. The system of claim 14, wherein the domain control unit is configured to change the target driving speed, when the location of the vehicle is within a restricted driving speed area.

16. The system of claim 14, wherein the domain control unit is configured to change the target driving speed, based on a speed corresponding to the restricted driving speed area, when the location of the vehicle is within a restricted driving speed area.

* * * * *